United States Patent
Robison et al.

(10) Patent No.: US 12,546,407 B2
(45) Date of Patent: Feb. 10, 2026

(54) BLAST TUBE ASSEMBLIES

(71) Applicant: CALDERA ENGINEERING, L.C., Provo, UT (US)

(72) Inventors: Jeffrey C. Robison, Provo, UT (US); Michael Luque, Provo, UT (US); Ryan Weber, Provo, UT (US); Grant Brockbank, Provo, UT (US)

(73) Assignee: CALDERA ENGINEERING, L.C., Provo, UT (US)

( * ) Notice: Subject to any disclaimer, the term of this patent is extended or adjusted under 35 U.S.C. 154(b) by 0 days.

(21) Appl. No.: 18/381,973

(22) Filed: Oct. 19, 2023

(65) Prior Publication Data

US 2024/0133477 A1  Apr. 25, 2024
US 2024/0229956 A9  Jul. 11, 2024

Related U.S. Application Data

(60) Provisional application No. 63/417,852, filed on Oct. 20, 2022.

(51) Int. Cl.
*F16K 25/00* (2006.01)
*F16K 25/04* (2006.01)

(52) U.S. Cl.
CPC ............ *F16K 25/005* (2013.01); *F16K 25/04* (2013.01)

(58) Field of Classification Search
CPC .......... F16K 25/005; F16K 25/04; F16K 1/42; C22B 3/02
See application file for complete search history.

(56) References Cited

U.S. PATENT DOCUMENTS

| | | | |
|---|---|---|---|
| 4,644,974 A | 2/1987 | Zingg | |
| 4,732,364 A * | 3/1988 | Seger | E21B 34/02 251/360 |
| 4,951,929 A | 8/1990 | Schwarz et al. | |
| 6,110,255 A | 8/2000 | Williams et al. | |
| 6,523,573 B2 * | 2/2003 | Robison | F15D 1/08 138/44 |
| 6,892,818 B2 * | 5/2005 | Mentesh | E21B 34/02 166/373 |
| 7,237,574 B2 | 7/2007 | Chipman et al. | |
| 12,234,922 B2 * | 2/2025 | Sanders | F16K 25/005 |
| 2001/0029988 A1 | 10/2001 | Robison et al. | |
| 2002/0069923 A1 | 6/2002 | Robison et al. | |
| 2010/0140530 A1 * | 6/2010 | Robison | F16K 25/005 29/890.132 |
| 2017/0241710 A1 | 8/2017 | Hogan | |
| 2021/0190223 A1 * | 6/2021 | Bayyouk | F04B 1/0461 |

OTHER PUBLICATIONS

International Searching Authority, International Search Report and Written Opinion dated Feb. 5, 2024 in PCT Serial No. PCT/US2023/035536.
International Bureau, International Preliminary Report on Patentability dated Mar. 1, 2025, in International Application No. PCT/US2023/035536.

* cited by examiner

*Primary Examiner* — Michael R Reid
(74) *Attorney, Agent, or Firm* — SNELL & WILMER L.L.P.

(57) ABSTRACT

A valve seat and blast tube assembly is provided herein. The valve seat and blast tube assembly may include a ceramic valve seat liner positioned within a valve seat housing. The valve seat may be configured to couple to a blast tube/choke assembly.

9 Claims, 5 Drawing Sheets

BLAST TUBE ASSEMBLIES

CROSS-REFERENCE TO RELATED APPLICATION

This application claims the benefit of and priority to U.S. Provisional Application Ser. No. 63/417,852, filed Oct. 20, 2022, the contents of which are hereby incorporated by reference in their entirety.

BACKGROUND

In various industrial processes, such as in metal refining, solids and liquids may be conveyed from one vessel to another under high temperatures and high pressures. Flow control may be desired between two vessels so that the flow may be stopped from time to time.

SUMMARY

In various embodiments, a valve seat and blast tube assembly comprising a valve seat coaxially disposed within a blast tube/choke assembly, the valve seat comprising a valve seat housing, a flash vessel flange comprising a central aperture, the valve seat disposed within the central aperture and extending through the central aperture, the blast tube/choke assembly comprising a distal face, the distal face extending radially with respect to the flash vessel flange and contacting at least one of proximal face of the flash vessel flange or a proximal face of a cladding.

In various embodiments, a valve seat and blast tube assembly comprising a valve seat coaxially disposed within a blast tube/choke assembly, the valve seat comprising a valve seat housing, a compliant sleeve disposed circumferentially around the valve seat housing, a flash vessel flange comprising a central aperture, the valve seat disposed within the central aperture and extending through the central aperture, the valve seat housing comprising a valve seat housing flange, the valve seat housing flange extending radially with respect to the flash vessel flange and contacting at least one of a proximal face of the flash vessel flange, a proximal face of a cladding, or the compliant sleeve.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Valve seat and blast tube assemblies disclosed herein provide, in various embodiments, an ability to accommodate various thicknesses of flash vessel flanges. Given that the systems discussed herein are anticipated to be used in contexts of high speed flow, in some cases supersonic flow, at elevated temperatures, mating a valve seat and blast tube becomes relevant to managing the flow while reducing or tending to reduce part life and easing the ability to repair on site, in various embodiments. In various embodiments, by configuring the blast tube to reach the top (most proximal portion) of the flash vessel flange, and, in various embodiments, extend completely through the flash vessel flange, then flash vessel flange thickness becomes less relevant to the mating of the valve seat and blast tube. In that regard, the thickness of the flash vessel flange can fluctuate without causing interference with how the valve seat and the blast tube mate.

Figure 1:
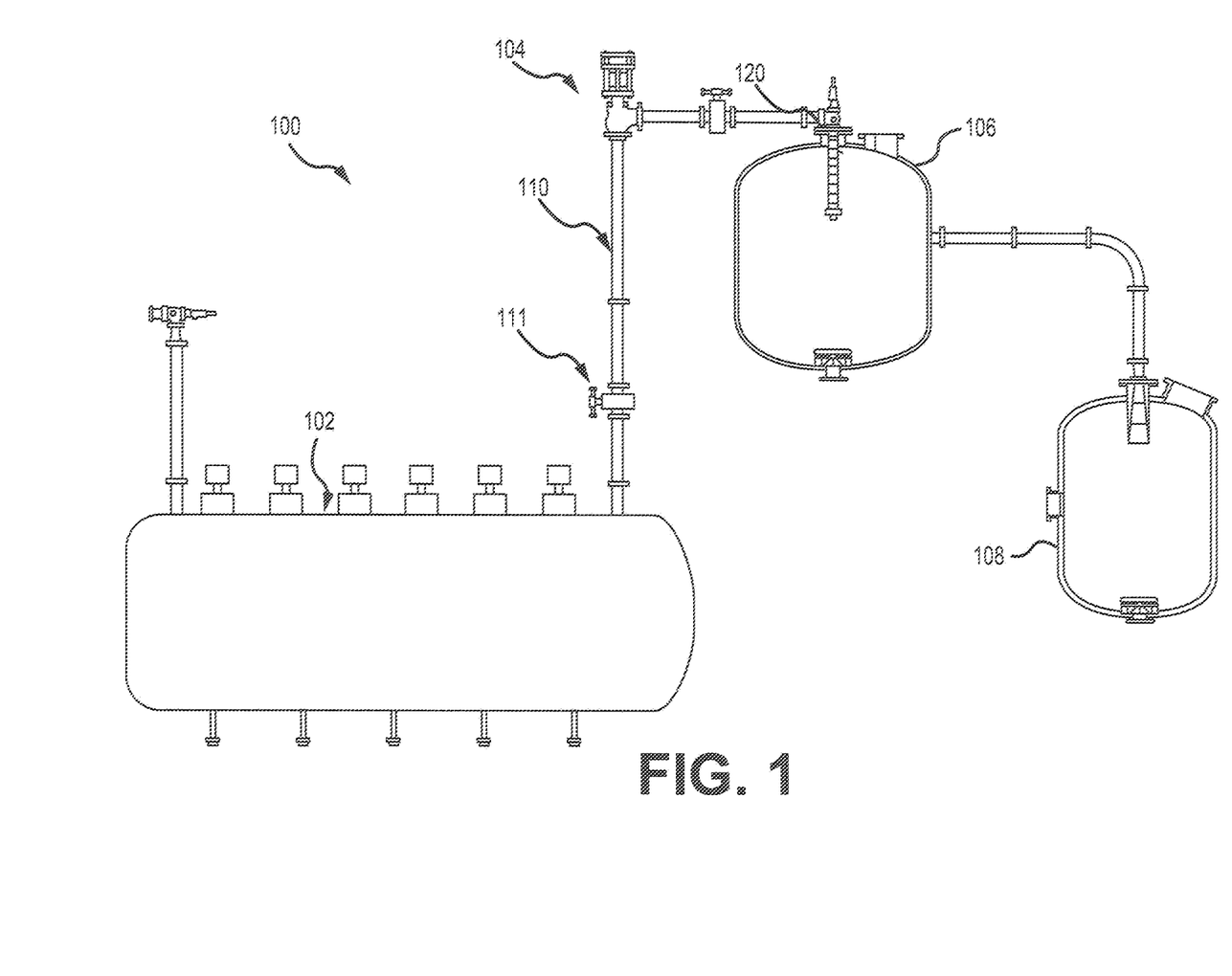
FIG. 1 illustrates an industrial process having a plug valve in accordance with various embodiments.

A mixture of solids and liquids, which may be referred to as slurry, may be subjected to high temperatures and/or high pressures in autoclave 102. For example, ore may be mixed with strong acids (e.g. $H_2SO_4$) or strong bases (e.g., NaOH or $NH_3$) and may be subjected to temperatures of from 80° C. to 300° C. or greater and total pressures of from about 10 psi (~68 kPa) to 900 psi (~6,205 kPa). The slurry may have a pH of between 1 to 4 (in an acidic application) or between about 10 to 14 (in a basic application). Such a process may be referred to as pressure leaching.

Autoclave 102 may be sized according to industrial need, but is in various embodiments greater than 200 m³. The size of discharge line 110 may also vary, but is in various embodiments greater than 50 mm in diameter.

Plug valve 104 may comprise an angle-type isolation valve, and, in various embodiments, may be considered a full bore or nearly full bore valve. Plug valve 104 may be configured in a "flow under" orientation in that flow tends to force the valve open, in contrast to a "flow over" valve where flow tends to force the valve closed. In that regard, slurry is configured to flow from autoclave 102 to high pressure flash tank 106.

Figure 2:
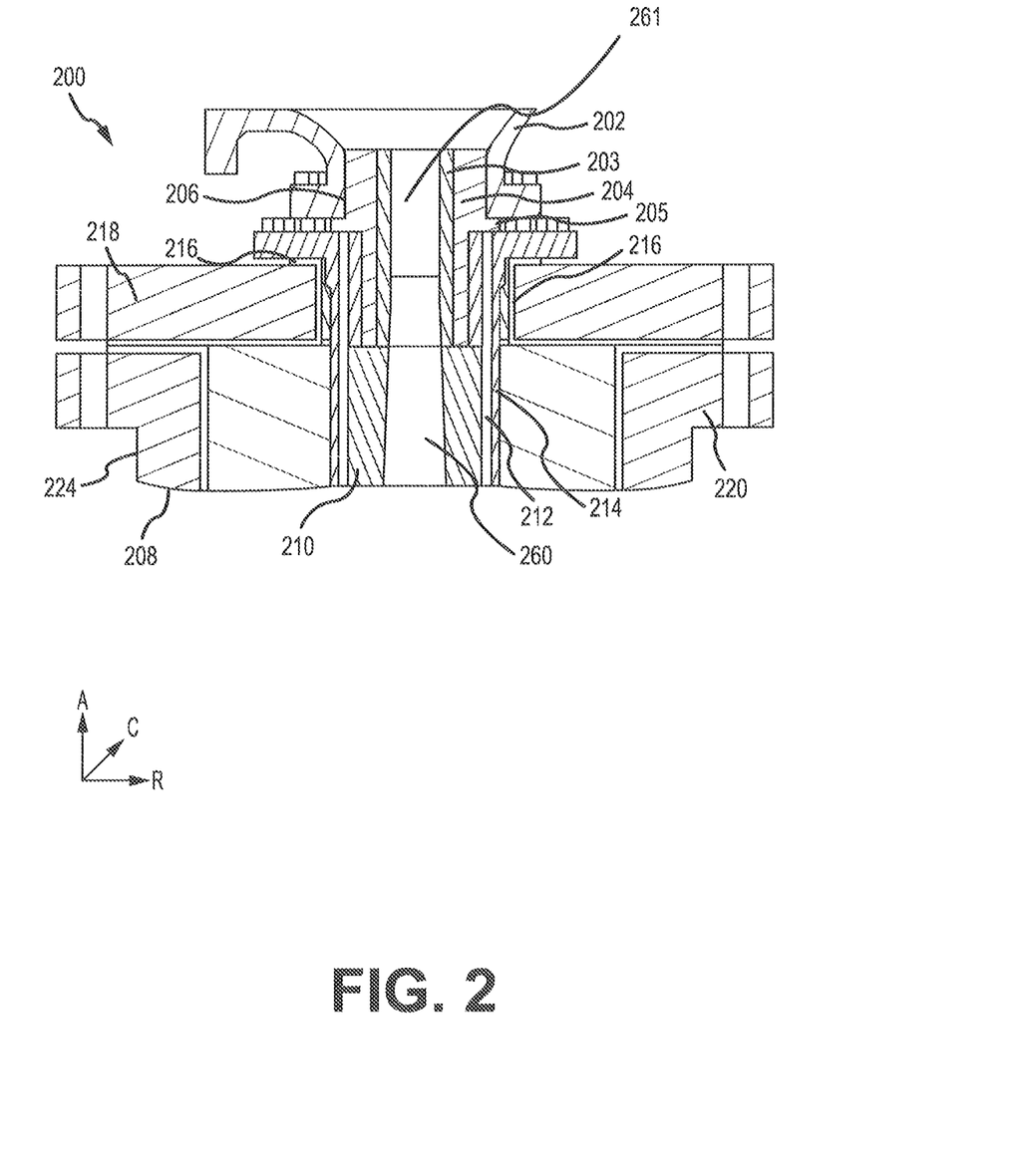
FIG. 2 illustrates a cross section view of a valve seat and blast tube assembly in accordance with various embodiments.
Figure 3:
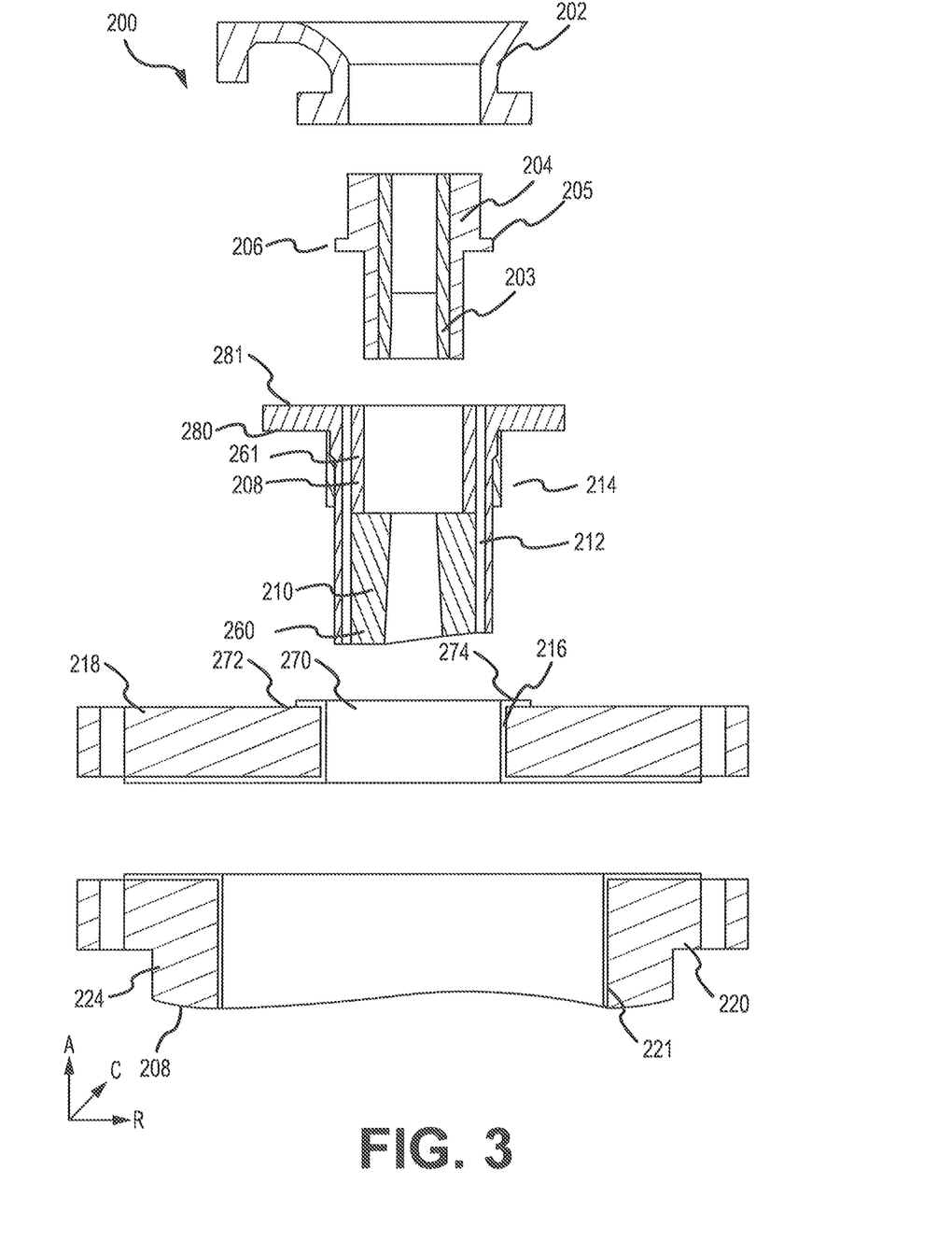
FIG. 3 illustrates an exploded view of the valve seat and blast tube assembly of FIG. 2, in accordance with various embodiments.

With reference to FIGS. 2 and 3, a valve seat and blast tube assembly 200 is shown in cross section. Axial-Radial-Circumferential (A-R-C) axes are shown for convenience in this and other Figures. It should be noted that a first component shown displaced in a positive axial direction with respect to a second component may be referred to as distal to the second component. Valve seat and blast tube assembly 200 may be used in a variety of valve configurations, including valve 120 coupled to high pressure flash tank 106, among others. Valve seat and blast tube assembly 200 may be coupled to high pressure flash tank 106 downstream of plug valve 120.

Valve seat and blast tube assembly 200 may join valve body 202 to flash vessel nozzle 224. Valve body 202 and flash vessel nozzle 224 may comprise one or more metal materials, such as various metals and metal alloys as is known in the industry. A plug head may be configured to interface with valve seat 206 to prevent mass flow from valve body 202 through valve seat and blast tube assembly 200 and more specifically, through valve seat 206. Valve seat and blast tube assembly 200 allows fluid communication between valve body 202 through flash vessel flange 218.

In various embodiments, the plug head may comprise a ceramic material. Ceramics are especially well suited to high erosion applications. The plug head may have a varying geometry. For example, the geometry may be spherical, parabolic, flat, or any other suitable geometric configuration. There may further be a translating shaft coupled to the plug head. In various embodiments, the plug head can comprise one or more metals, such as, for example, various steel alloys, stainless steel, titanium, ceramics such as silicon carbide (SiC), boron carbide ($B_4C$), tungsten carbide (WC), and zirconia ($ZrO_2$), and nickel chromium alloys, such as an austenitic nickel-chromium alloy such as the austenitic nickel-chromium alloy sold under the trademark INCONEL. Nickel chromium alloys may be well suited to high temperature environments.

Valve seat 206 comprises valve seat housing 204 and valve seat liner 203. Valve seat housing 204 may be disposed coaxial to valve seat liner 203, though in various embodiments valve seat housing 204 may not be disposed coaxial to valve seat liner 203. Valve seat housing 204 may be mated to valve seat liner 203 through any suitable method of joinery, for example, an interference fit or a press fit, among others. Adhesives, mortar, or other joinery compound may further be used to couple valve seat housing 204 to valve seat liner 203.

In various embodiments, valve seat liner 203 can comprise one or more ceramics such as silicon carbide (SiC), boron carbide ($B_4C$), tungsten carbide (WC), and zirconia ($ZrO_2$). Valve seat liner 203 is generally cylindrical in geometry, having a constant inner diameter (ID) for at least a portion of valve seat liner 203's axial length, though the ID may taper (decrease) or flare (increase) from axial end to axial end in various embodiments. In various embodiments, valve seat liner 203 spans the axial length of blast tube assembly 200.

Valve seat housing 204 may comprise one or more metals, such as, for example, various steel alloys, stainless steel, titanium, titanium alloys (e.g. Ti-6Al-4V), and nickel chromium alloys, such as an austenitic nickel-chromium alloy such as the austenitic nickel-chromium alloy sold under the trademark INCONEL. Nickel chromium alloys may be well suited to high temperature environments. Valve seat housing 204 may comprise valve seat housing flange 205 that may contact, abut, or otherwise adjoin valve body 202. Valve seat housing 204 may fit within an aperture of flash vessel flange 218 and be disposed coaxial therewith. In that regard, the distal most portion of valve seat housing 204 and flash vessel flange 218 may be formed in any suitable geometry, but in various embodiments, flash vessel flange 218 comprises an annular disk having a central aperture 270. Cladding 216 lines the central aperture 270 of flash vessel flange 218 along flash vessel flange 218's axial length and extends about at least one radial face of flash vessel flange 218. Cladding 216 may comprise any suitable material, including various steel alloys, stainless steel, titanium, titanium alloys (e.g. Ti-6Al-4V), and nickel chromium alloys, such as an austenitic nickel-chromium alloy such as the austenitic nickel-chromium alloy sold under the trademark INCONEL. In that regard, cladding 216 contacts the distal face 280 of blast tube/choke assembly 214.

Valve seat housing flange 205 extends radially with respect to flash vessel flange 218 and couples to, abuts, or otherwise adjoins a proximal face 281 of blast tube/choke assembly 214. In that regard, valve seat housing flange 205 prevents valve seat 206 from leaving central aperture 270 through interference between the valve seat housing flange 205 and proximal face 281 of blast tube/choke assembly 214. In turn, distal face 280 of blast tube/choke assembly 214 prevents blast tube/choke assembly 214 from leaving central aperture 270 through interference between the distal face 280 of blast tube/choke assembly 214 and at least one of the proximal face 272 of flash vessel flange 218 or a proximal face 274 of cladding 216.

Blast tube/choke assembly 214 at least partially receives valve seat 206 and is disposed coaxial thereto. Blast tube/choke assembly 214 comprises blast tube liner 210, binder 212, and blast tube housing 208.

Blast tube housing 208 may comprise any suitable material, including various steel alloys, stainless steel, titanium, titanium alloys (e.g. Ti-6Al-4V), and nickel chromium alloys, such as an austenitic nickel-chromium alloy such as the austenitic nickel-chromium alloy sold under the trademark INCONEL. Blast tube housing 208 is received by the central aperture of flash vessel flange 218. Blast tube housing 208 may contact cladding 216. Binder 212 comprises a compound used to join and/or thermally insulate blast tube liner 210. Binder 212 may comprise mortar, acid resistant bricks, and/or PTFE. Binder 212 acts to retain blast tube liner 210 within blast tube housing 208 but also acts to thermally insulate blast tube liner 210. Thermal insulation tends to reduce the effects of thermal creep on blast tube housing 208.

Blast tube liner 210 may comprise one or more ceramics such as silicon carbide (SiC), boron carbide ($B_4C$), tungsten carbide (WC), and zirconia ($ZrO_2$). Blast tube liner 210 may be divided into two portions, upper blast tube liner 261 and lower blast tube liner 260. Upper blast tube liner 261 is disposed proximal to lower blast tube liner 260.

Upper blast tube liner 261 is configured with a constant or nearly constant ID across the axial length. In this manner, upper blast tube liner 261 receives valve seat housing 204. More specifically, valve seat housing 204 is received within upper blast tube liner 261. In that regard, upper blast tube liner 261 may contact the outer diameter surface of valve seat housing 204.

Lower blast tube liner 260 is disposed proximal to upper blast tube liner 261. In various embodiments, lower blast tube liner 260 and upper blast tube liner 261 are illustrated as two separate, discrete components that may abut one another. However, in various embodiments, lower blast tube liner 260 and upper blast tube liner 261 may comprise a single, monolithic component that has a varying inner surface geometry and/or ID variation across the axial length.

Lower blast tube liner 260 comprises a proximal step to receive valve seat housing 204 and prevent valve seat housing 204 from moving in an axial distal direction. Moreover, lower blast tube liner 260 comprises an ID that is less than the ID of upper blast tube liner 261. In various embodiments, the ID of lower blast tube liner 260 may be configured to be the same as, or approximately the same as, the ID of valve seat liner 203, where the term "approximately" in this context only mean +/−5%. By matching the ID of valve seat liner 203, lower blast tube liner 260 may help control the radial expansion of the flow of fluid within valve seat liner 203. Lower blast tube liner 260 has an increasing ID diameter toward the proximal end of lower blast tube liner 260, taking a flared geometry.

Blast tube/choke assembly 214 may axially extend through the central aperture 270 of flash vessel flange 218. In various embodiments, blast tube/choke assembly 214 terminates at or approximately near the distal radial face of flash vessel flange 218, though in various embodiments, blast tube/choke assembly 214 may axially extend past this point.

Flash vessel nozzle 224 is disposed distal to flash vessel flange 218. Flash vessel nozzle 224 may be coupled to flash vessel. Flash vessel nozzle 224 includes flash vessel nozzle flange 220 that is configured to mate with flash vessel flange 218. Cladding 221, similar to cladding 216, surrounds the inner diameter of flash vessel nozzle 224 and extends radially outward across at least a portion of flash vessel nozzle flange 220.

Figure 4:
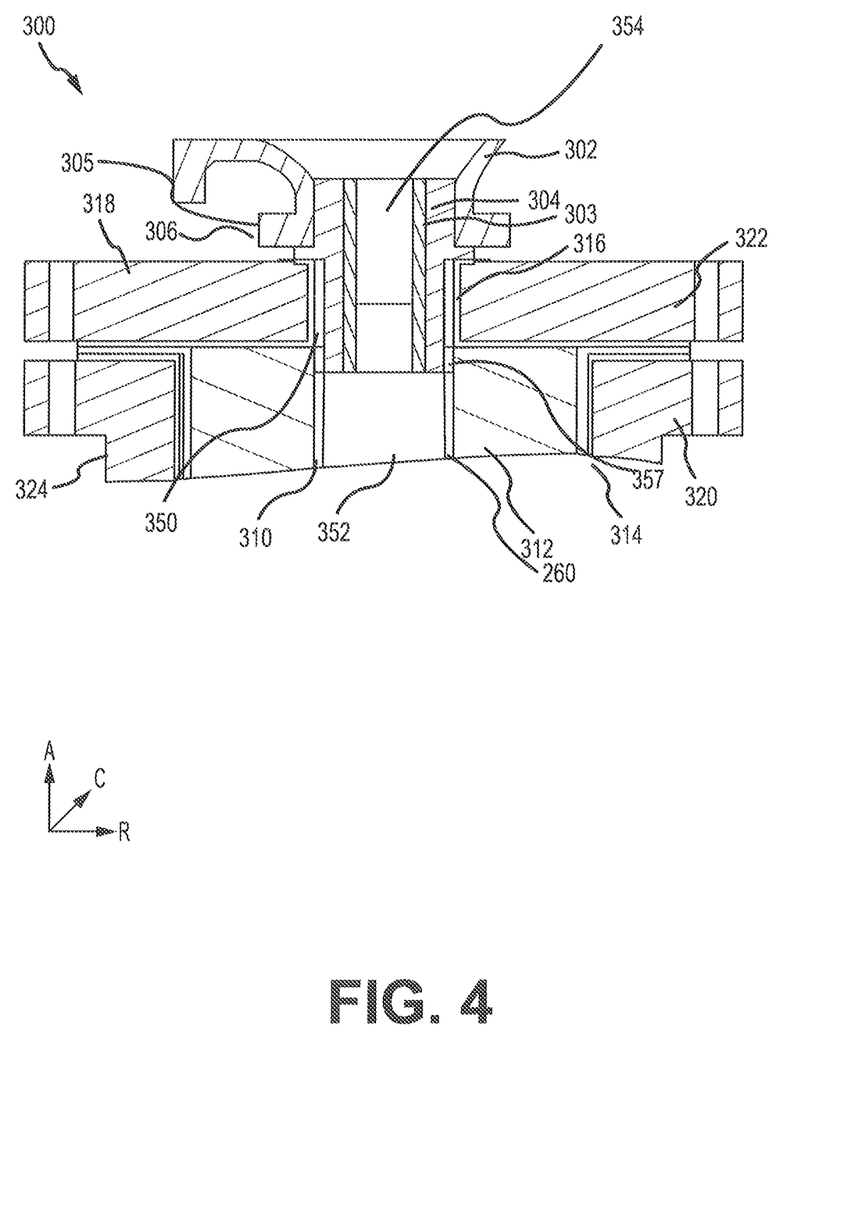
FIG. 4 illustrates a cross section view of a valve seat and blast tube assembly in accordance with various embodiments.
Figure 5:
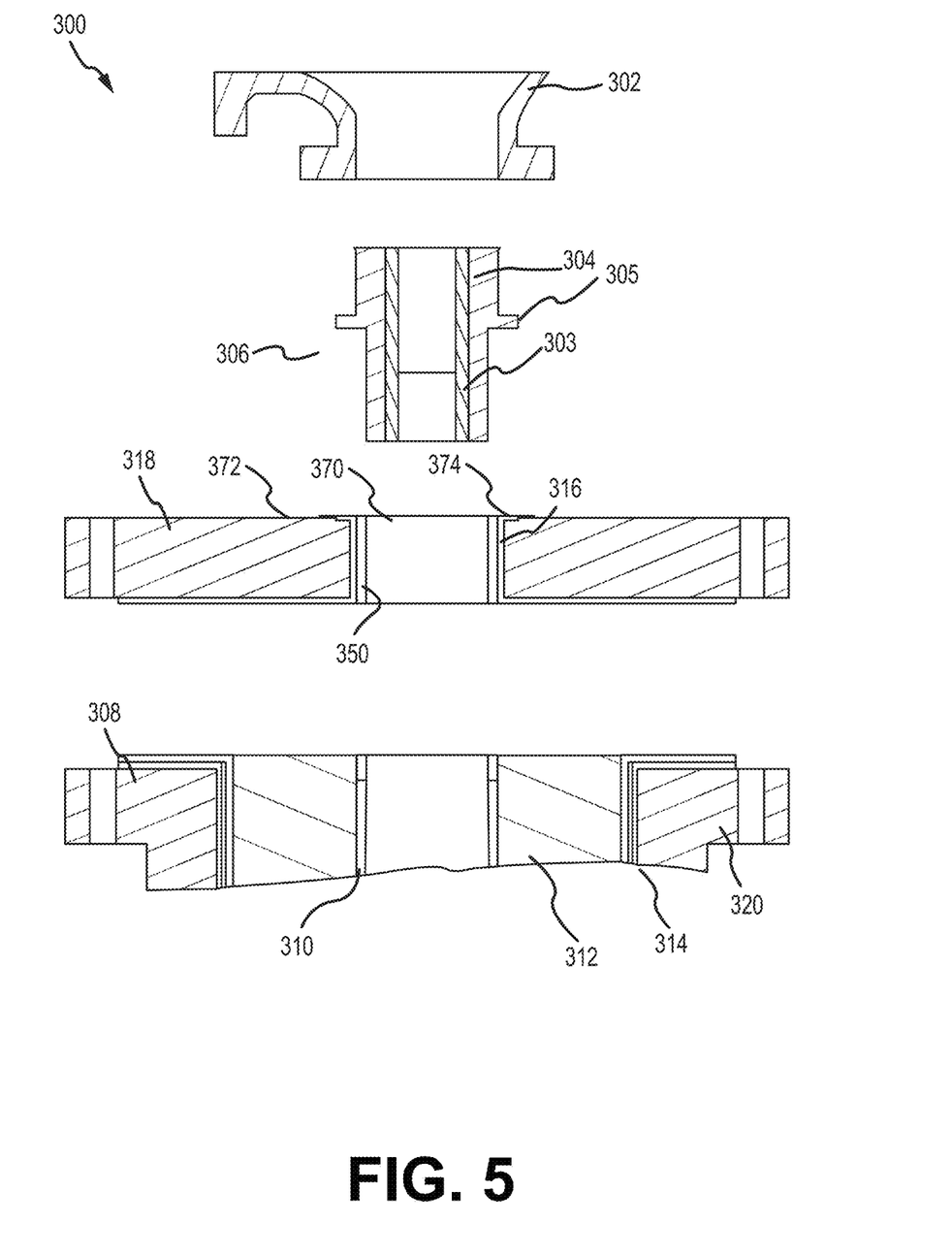
FIG. 5 illustrates an exploded view of the valve seat and blast tube assembly of FIG. 4, in accordance with various embodiments.

With reference to FIGS. 4 and 5, a valve seat and blast tube assembly 300 is shown in cross section. Axial-Radial-Circumferential (A-R-C) axes are shown for convenience. Valve seat and blast tube assembly 300 may be used in a variety of valve configurations, including in valve 120 among others. Valve seat and blast tube assembly 300 may be coupled to high pressure flash tank 106 downstream of plug valve 120.

Valve seat and blast tube assembly 300 may join valve body 302 to flash vessel nozzle 324. Flash vessel nozzle 324 includes flash vessel nozzle flange 320 that is configured to mate with flash vessel flange 318. Valve body 302 and flash vessel nozzle 324 may comprise one or more metal materials, such as various metals and metal alloys as is known in the industry. A plug head may be configured to interface with valve seat 306 to prevent mass flow from valve body 302 through valve seat and blast tube assembly 300 and more specifically, through valve seat 306. Valve seat and blast tube assembly 300 allows fluid communication between valve body 302 through flash vessel flange 318.

In various embodiments, the plug head may comprise a ceramic material. Ceramics are especially well suited to high erosion applications. The plug head may have a varying geometry. For example, the geometry may be spherical, parabolic, flat, or any other suitable geometric configuration. There may further be a translating shaft coupled to the plug head. In various embodiments, the plug head can comprise one or more metals, such as, for example, various steel alloys, stainless steel, titanium, ceramics such as silicon carbide (SiC), boron carbide ($B_4C$), tungsten carbide (WC), and zirconia ($ZrO_2$), and nickel chromium alloys, such as an austenitic nickel-chromium alloy such as the austenitic nickel-chromium alloy sold under the trademark INCONEL. Nickel chromium alloys may be well suited to high temperature environments.

Valve seat 306 comprises valve seat housing 304 and valve seat liner 303. Valve seat housing 304 may be disposed coaxial to valve seat liner 303, though in various embodiments valve seat housing 304 may not be disposed coaxial to valve seat liner 303. Valve seat housing 304 may be mated to valve seat liner 303 through any suitable method of joinery, for example, an interference fit or a press fit, among others. Adhesives, mortar, or other joinery compound may further be used to couple valve seat housing 304 to valve seat liner 303.

In various embodiments, valve seat liner 303 can comprise one or more ceramics such as silicon carbide (SiC), boron carbide ($B_4C$), tungsten carbide (WC), and zirconia ($ZrO_2$). Valve seat liner 303 is generally cylindrical in geometry, having a constant inner diameter (ID) for at least a portion of valve seat liner 303's axial length, though the ID may taper (decrease) or flare (increase) from axial end to axial end in various embodiments. In various embodiments, valve seat liner 303 spans the axial length of blast tube assembly 300. As illustrated, valve seat liner 303 has a constant ID from proximal end to distal end.

Valve seat housing 304 may comprise one or more metals, such as, for example, various steel alloys, stainless steel, titanium, titanium alloys (e.g. Ti-6AI-4V), and nickel chromium alloys, such as an austenitic nickel-chromium alloy such as the austenitic nickel-chromium alloy sold under the trademark INCONEL. Nickel chromium alloys may be well suited to high temperature environments. Valve seat housing 304 may comprise valve seat housing flange 305 that may contact, abut, or otherwise adjoin valve body 302. Valve seat housing 304 may fit within an aperture of flash vessel flange 318 and be disposed coaxial therewith. In that regard, the distal most portion of valve seat housing 304 and flash vessel flange 318 may be formed in any suitable geometry, but in various embodiments, flash vessel flange 318 comprises an annular disk having a central aperture 370. Cladding 316 lines the central aperture 370 of flash vessel flange 318 along flash vessel flange 318's axial length and extends about at least one radial face of flash vessel flange 318. Cladding 316 may have a proximal face 374. Cladding 316 may comprise any suitable material, including various steel alloys, stainless steel, titanium, titanium alloys (e.g. Ti-6AI-4V), and nickel chromium alloys, such as an austenitic nickel-chromium alloy such as the austenitic nickel-chromium alloy sold under the trademark INCONEL.

Compliant sleeve 350 is disposed radially inward of cladding 316. Compliant sleeve 350 is configured to be disposed within and/or at least partially line the axial surface of the central aperture 370 of flash vessel flange 318. Compliant sleeve 350 may have a constant ID throughout the axial length of compliant sleeve 350. Compliant sleeve 350 may comprise one or more of thermoplastics and/or thermosets and/or polymeric materials. Compliant material include, for example, rubber, silicone, synthetic rubbers, polytetrafluoroethylene (PTFE), expanded PTFE, and other similar materials. For example, compliant sleeve 350 can comprise rigid or semi-rigid PTFE. In various embodiments, compliant sleeve 350 comprises carbon filled PTFE. Carbon filled PTFE may comprise a mixture of PTFE and a carbon form, for example, carbon powder. Carbon filled PTFE may comprise from 0.2% carbon powder to 40% carbon powder by weight, with the balance of the weight being PTFE. Carbon filled PTFE may comprise PTFE and graphite. In various embodiments, compliant sleeve 350 comprises a non-polymeric material, such as a silicon-based compound or a metallic material. For example, at elevated temperatures (such as, for example, above 260° C.), a silicon-based compound or metallic material may have a higher coefficient of thermal expansion (CTE), which may improve performance of compliant sleeve 350 (as compared to the performance of a polymeric material at the same elevated temperature).

Valve seat housing flange 305 extends radially with respect to flash vessel flange 318 and couples to, abuts, or otherwise adjoins a proximal face 372 of flash vessel flange 318. In that regard, valve seat housing flange 305 prevents valve seat 306 from leaving central aperture 370 through interference between the valve seat housing flange 305 and at least one of the proximal face 372 of flash vessel flange 318 or a proximal face 274 of cladding 216.

Compliant sleeve 350 may act to allow valve seat 306 to be easily removed from flash vessel flange 318 during servicing. Moreover, compliant sleeve 350 may have a higher CTE than cladding 316 and/or valve seat housing 304 and/or flash vessel flange 318. In that regard, in response to increased temperatures, compliant sleeve 350 may expand at a higher rate, thus creating a more secure seal.

Blast tube/choke assembly 314 at least partially receives valve seat 306 and is disposed coaxial thereto. Blast tube/choke assembly 314 comprises blast tube liner 310, binder 312, and blast tube housing 308.

Blast tube housing 308 may comprise any suitable material, including various steel alloys, stainless steel, titanium, titanium alloys (e.g. Ti-6AI-4V), and nickel chromium alloys, such as an austenitic nickel-chromium alloy such as the austenitic nickel-chromium alloy sold under the trademark INCONEL. Blast tube housing 308 is received by the central aperture of flash vessel flange 318 may contact cladding 316. Binder 312 comprises a compound used to join and/or thermally insulate blast tube liner 310. Binder 312 may comprise mortar, acid resistant bricks, and/or PTFE. Binder 312 acts to retain blast tube liner 310 within blast tube housing 308 but also acts to thermally insulate blast tube liner 310. Thermal insulation tends to reduce the effects of thermal creep on blast tube housing 308. Blast tube liner 310 may comprise one or more ceramics such as silicon carbide (SiC), boron carbide ($B_4C$), tungsten carbide (WC), and zirconia ($ZrO_2$).

Blast tube/choke assembly 314 couples to flash vessel flange 318. Valve seat 306 extends distally beyond flash vessel flange 318 to seat within blast tube/choke assembly 314. In that regard, valve seat 306 abuts, meets, or otherwise adjoins blast tube/choke assembly 314. Seal ring 357 may circumferentially surround valve seat housing 304 and axially abut blast tube liner 310. Seal ring 357 may be sized and configured to transition valve seat housing 304 to blast tube liner 310 while reducing or tending to reduce interference with flow dynamics. Blast tube liner 310 may have a larger ID than the ID of valve seat liner 303 Though in various embodiments blast tube liner 310 may have the same ID as valve seat liner 303 as illustrated, the ID of blast tube liner 310 may be larger than valve seat liner 303 In that regard, distal interior volume 352 has a larger ID than proximal interior volume 354. Such configuration impacts flow dynamics and may be used in various scenarios as indicated by flow dynamic needs.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A valve seat and blast tube assembly comprising:
   a valve seat coaxially disposed within a blast tube/choke assembly, the valve seat comprising a valve seat housing comprising a valve seat flange, the valve seat flange contacting a proximal face of the blast tube/choke assembly;
   a flash vessel flange comprising a central aperture, the blast tube/choke assembly coaxially disposed within the central aperture and extending through the central aperture, the blast tube/choke assembly comprising a distal face, the distal face extending radially with respect to the flash vessel flange and contacting a proximal face of a cladding wherein the cladding lines the central aperture and circumferentially surrounds the valve seat housing.

2. The valve seat and blast tube assembly of claim 1, wherein the cladding contacts a distal face of the flash vessel flange.

3. The valve seat and blast tube assembly of claim 2, wherein the valve seat comprises a ceramic valve seat liner comprising at least one of silicon carbide (SiC), boron carbide ($B_4C$), tungsten carbide (WC), and zirconia ($ZrO_2$).

4. The valve seat and blast tube assembly of claim 3, wherein the blast tube/choke assembly comprises a ceramic blast tube liner.

5. The valve seat and blast tube assembly of claim 4, wherein the ceramic blast tube liner contacts the ceramic valve seat liner.

6. The valve seat and blast tube assembly of claim 5, wherein an inner diameter of the ceramic valve seat liner increases in a distal direction.

7. The valve seat and blast tube assembly of claim 4, wherein an inner diameter of the ceramic valve seat liner is less than an inner diameter of the ceramic blast tube liner.

8. The valve seat and blast tube assembly of claim 7, further comprising a valve body coupled to the valve seat.

9. The valve seat and blast tube assembly of claim 8, further comprising mortar disposed radially outward of the ceramic blast tube liner.

\* \* \* \* \*